United States Patent
Li et al.

(10) Patent No.: US 11,646,443 B2
(45) Date of Patent: May 9, 2023

(54) LITHIUM SOLID BATTERY (71) Applicant: TOYOTA JIDOSHA KABUSHIKI KAISHA, Toyota (JP)

(72) Inventors: Ximeng Li, Susono (JP); Masafumi Nose, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 16 days.

(21) Appl. No.: 16/055,303

(22) Filed: Aug. 6, 2018

(65) Prior Publication Data

US 2019/0051933 A1 Feb. 14, 2019

(30) Foreign Application Priority Data

Aug. 10, 2017 (JP) .............................. JP2017-154876

(51) Int. Cl.
| | |
|---|---|
| *H01M 10/0562* | (2010.01) |
| *H01M 4/62* | (2006.01) |
| *H01M 10/0525* | (2010.01) |
| *H01M 10/42* | (2006.01) |
| *H01M 4/133* | (2010.01) |
| *H01M 4/587* | (2010.01) |

(Continued)

(52) U.S. Cl.
CPC ....... *H01M 10/0562* (2013.01); *H01M 4/133* (2013.01); *H01M 4/382* (2013.01); *H01M 4/587* (2013.01); *H01M 4/621* (2013.01); *H01M 4/625* (2013.01); *H01M 10/02* (2013.01); *H01M 10/0525* (2013.01); *H01M 10/42* (2013.01); *H01M 2010/4292* (2013.01); *H01M 2300/0065* (2013.01)

(58) Field of Classification Search
CPC .. H01M 4/382; H01M 4/621; H01M 10/0562; H01M 2300/0065
See application file for complete search history.

(56) References Cited

U.S. PATENT DOCUMENTS

| | | | |
|---|---|---|---|
| 6,534,214 B1 * | 3/2003 | Nishijima | H01M 4/621 429/212 |
| 10,707,523 B2 * | 7/2020 | Harada | C01B 25/45 |

(Continued)

FOREIGN PATENT DOCUMENTS

| | | |
|---|---|---|
| JP | H10-302794 A | 11/1998 |
| JP | 2010-015885 A | 1/2010 |

(Continued)

OTHER PUBLICATIONS

JP2013-089417A Espacenet Machine Translation (Year: 2013).*

*Primary Examiner* — Brittany L Raymond
(74) *Attorney, Agent, or Firm* — Oliff PLC (57) ABSTRACT

A main object of the present disclosure is to provide a lithium solid battery in which the coulomb efficiency of the battery upon deposition and dissolution of a metal lithium is improved. The above object is achieved by providing a lithium solid battery comprising: an anode current collector, a solid electrolyte layer, a cathode active material layer, and a cathode current collector; wherein the lithium solid battery comprises a Li storing layer between the anode current collector and the solid electrolyte layer; an amount of Li storage of the Li storing layer to a cathode charging capacity is 0.13 or more; and a thickness of the Li storing layer is 83 µm or less.

2 Claims, 2 Drawing Sheets

(51) Int. Cl.
*H01M 4/38* (2006.01)
*H01M 10/02* (2006.01)

(56) References Cited

U.S. PATENT DOCUMENTS

| | | | |
|---|---|---|---|
| 2003/0108795 A1* | 6/2003 | Tamura | H01M 4/134 |
| | | | 429/231.95 |
| 2006/0078797 A1* | 4/2006 | Munshi | H01M 4/587 |
| | | | 429/231.8 |
| 2008/0003503 A1* | 1/2008 | Kawakami | H01M 4/134 |
| | | | 429/231.5 |
| 2013/0295464 A1* | 11/2013 | Yanagi | H01M 4/136 |
| | | | 429/231.9 |
| 2014/0203787 A1 | 7/2014 | Yamamoto | |
| 2015/0037688 A1 | 2/2015 | Otsuka et al. | |
| 2015/0162643 A1* | 6/2015 | Tagami | H01M 4/587 |
| | | | 429/246 |
| 2016/0315353 A1 | 10/2016 | Matsushita et al. | |
| 2017/0155127 A1 | 6/2017 | Shindo et al. | |
| 2017/0207440 A1 | 7/2017 | Hama et al. | |
| 2019/0020034 A1 | 1/2019 | Umetsu et al. | |

FOREIGN PATENT DOCUMENTS

| | | |
|---|---|---|
| JP | 2010-044957 A | 2/2010 |
| JP | 2013-073846 A | 4/2013 |
| JP | 2013-089417 A | 5/2013 |
| JP | 2015-028854 A | 2/2015 |
| JP | 2015-032355 A | 2/2015 |
| JP | 2016-100088 A | 5/2016 |
| JP | 2017-103065 A | 6/2017 |
| JP | 2017-130283 A | 7/2017 |
| JP | 2019-33053 A | 2/2019 |
| WO | 2013/018607 A1 | 2/2013 |
| WO | 2017/126682 A1 | 7/2017 |

* cited by examiner

FIG. 1A

Discharge ↑ ↓ Charge

LITHIUM SOLID BATTERY

TECHNICAL FIELD

The present disclosure relates to a lithium solid battery.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry. A lithium battery has been presently noticed from the viewpoint of high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. On the contrary, a lithium battery, namely a battery all-solidified by replacing the liquid electrolyte with a solid electrolyte layer, is conceived to intend the simplification of the safety device and be excellent in production cost and productivity for the reason that the flammable organic solvent is not used in the battery.

Also, the occurrence of short circuit due to dendrite has been known in the field of lithium batteries. Lithium deposited in an anode active material layer during charge grows to the direction of a cathode active material layer, and the anode active material layer physically contacts with the cathode active material layer to cause the short circuit. Several studies have been made for preventing the short circuit due to the growth of dendrite.

Patent Literature 1 discloses a nonaqueous battery provided with an anode current collector, an anode containing an anode active material, a cathode containing a cathode active material, a cathode current collector, and a solid electrolyte layer interposed between these cathode and anode active material layers; the anode contains an anode active material layer that contains an anode active material including lithium, and a conductive powder layer containing conductive powder; and the conductive powder layer is arranged between the anode current collector and the anode active material layer. On the other hand, Patent Literature 2 discloses a lithium secondary battery in which the anode reaction is the deposition and dissolution reaction of a metal lithium, the lithium secondary battery comprising a first electrode where the deposition and dissolution reaction of the metal lithium occur, and a second electrode which prevents dendrite deposition of the metal lithium.

CITATION LIST

Patent Literatures

Patent Literature 1: Japanese Patent Application Publication (JP-A) No. 2013-089417
Patent Literature 2: JP-A No. H10-302794

SUMMARY OF DISCLOSURE

Technical Problem

In order to inhibit the short circuit due to dendrite growth of the metal lithium as in Patent Literatures 1 and 2, there has been room for improvement in coulomb efficiency of a battery when the battery comprises an anode including a plurality of layers.

The present disclosure has been made in view of the above circumstances, and a main object thereof is to provide a lithium solid battery in which the coulomb efficiency of the battery is improved.

Solution to Problem

In order to solve the problem, the present disclosure provides a lithium solid battery comprising: an anode current collector, a solid electrolyte layer, a cathode active material layer, and a cathode current collector, in this order; wherein the lithium solid battery comprises a Li storing layer between the anode current collector and the solid electrolyte layer; an amount of Li storage of the Li storing layer to a cathode charging capacity (amount of Li storage/cathode charging capacity) is 0.13 or more; and a thickness of the Li storing layer is 83 µm or less.

According to the present disclosure, the Li storing layer is arranged between the anode current collector and the solid electrolyte layer, the amount of Li storage of the Li storing layer to the cathode charging capacity is the specific value or more and the thickness of the Li storing layer is the specific thickness or less, so as to improve the coulomb efficiency of the battery.

In the disclosure, the thickness of the Li storing layer may be 4 µm or more.

In the disclosure, the amount of Li storage of the Li storing layer to the cathode charging capacity may be 3.02 or less.

In the disclosure, the Li storing layer may comprise a carbon material.

In the disclosure, the carbon material is preferably KETJENBLACK, an electro-conductive carbon black.

In the disclosure, the Li storing layer may comprise a binder.

In the disclosure, the binder is preferably a polyvinylidene fluoride (PVDF).

In the disclosure, the Li storing layer may include a solid electrolyte.

In the disclosure, a Li ion conductivity of the Li storing layer is preferably lower than a Li ion conductivity of the solid electrolyte layer.

Advantageous Effects of Disclosure

The Li storing layer of the present disclosure exhibits effects that the coulomb efficiency of a battery can be improved.

DESCRIPTION OF EMBODIMENTS

The lithium solid battery of the present disclosure is hereinafter described in detail.

Lithium Solid Battery

Figure 1A:
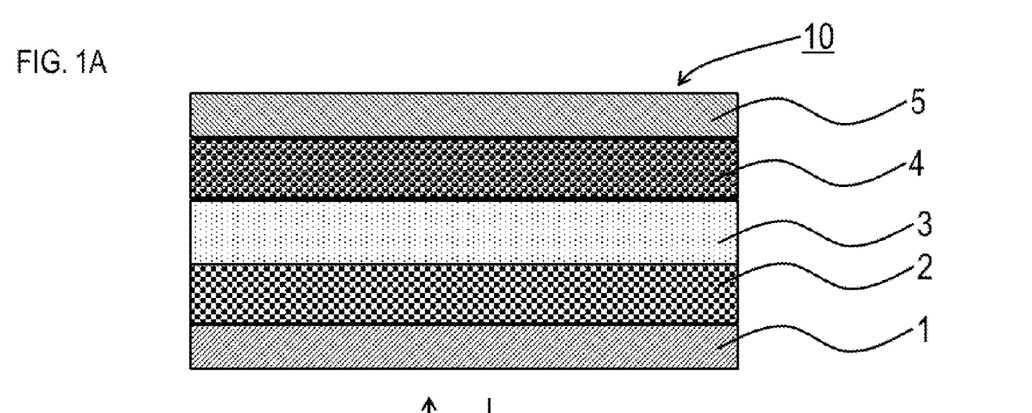
FIGS. 1A and 1B are schematic cross-sectional views illustrating an example of the lithium solid battery of the present disclosure.
Figure 1B:
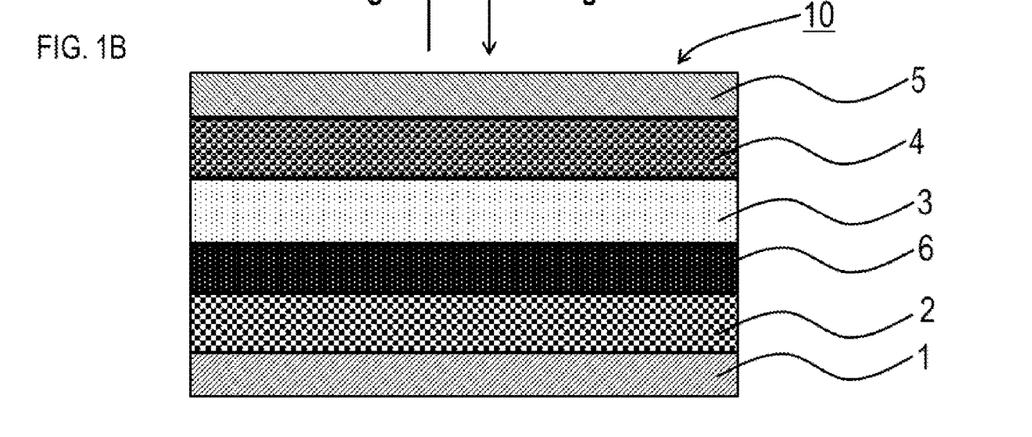

First, the lithium solid battery of the present disclosure is explained. FIGS. 1A and 1B are schematic cross-sectional views illustrating an example of the lithium solid battery of the present disclosure. Lithium solid battery 10 illustrated in FIG. 1A is provided with anode current collector 1, solid electrolyte layer 3, cathode active material layer 4, and cathode current collector 5, in this order, and provided with Li storing layer 2 between anode current collector 1 and solid electrolyte layer 3. Also, solid electrolyte layer 3 contains a solid electrolyte. The present disclosure features configurations that the amount of Li storage of Li storing layer 2 to the cathode charging capacity is the specific value or more, and the thickness of the Li storing layer is the specific range or less. Lithium solid battery 10 of the present disclosure is a battery utilizing the deposition and dissolution reaction of a metal lithium as an anode reaction, and the advantage thereof is high energy density. As illustrated in FIG. 1B, in lithium solid battery 10, anode active material layer 6 that is deposition lithium is generated between solid electrolyte layer 3 and Li storing layer 2 by charging the battery.

The Li storing layer is formed between the anode current collector and the solid electrolyte layer, the value of the amount of Li storage of the Li storing layer to the cathode charging capacity (amount of Li storage/cathode charging capacity) is 0.13 or more, and the thickness of the Li storing layer is 83 µm or less, so as to allow the lithium solid battery to have improved coulomb efficiency. Incidentally, the coulomb efficiency of a battery in the present disclosure refers to a ratio of the discharging capacity to the charging capacity. The reason of this effect is presumed as follows.

First, when the amount of Li storage/cathode charging capacity of the Li storing layer between the anode current collector and the solid electrolyte layer is less than 0.13, the deposition of a metal lithium occurs in other than the Li storing layer, for example, in the solid electrolyte layer. Accordingly, since the metal lithium has electron conductivity, the interface where the metal lithium deposited in the void of the solid electrolyte layer contacts with the solid electrolyte becomes a new deposition surface of the metal lithium. This phenomenon repeatedly occurs toward the cathode active material layer, and the dendrite is not sufficiently inhibited from growing toward the cathode active material layer; the dendrite grows from the Li storing layer to the cathode active material layer side to cause short circuit. It is presumed that the coulomb efficiency of the battery is degraded since the cathode active material in the cathode active material layer side self-discharges.

On the other hand, when the thickness of the Li storing layer between the anode current collector and the solid electrolyte layer is more than 83 µm, there are many places to store Li in the Li storing layer and thus the metal lithium is dispersed and deposited in the Li storing places of the Li storing layer to inhibit the dendrite from growing toward the cathode active material layer. However, the metal lithium grows until the anode current collector side during charge; the distance from the metal lithium deposited in the anode current collector side to the solid electrolyte layer becomes long, lithium ion conducting path is cut-off, which disables dissolution during discharge. Thus, it is presumed that the coulomb efficiency of the battery is degraded since the usage rate of the deposited metal lithium lowers.

To solve the problem, the amount of Li storage of the Li storing layer to the cathode charging capacity (amount of Li storage/cathode charging capacity) is 0.13 or more, so as to inhibit the dendrite from growing until the cathode active material layer side. Also, the thickness of the Li storing layer is 83 µm or less, so that the metal lithium capable of being reversibly deposited and dissolved increases, and thus the coulomb efficiency of the battery is presumably improved. In this manner, in the embodiments of the present disclosure, the coulomb efficiency of the battery can be improved.

The lithium solid battery of the present disclosure is hereinafter explained in each constitution.

(1) Anode Current Collector

The material for the anode current collector is preferably a material that does not alloy with Li, and examples thereof may include SUS, copper, nickel, and carbon. Examples of the shape of the anode current collector may include a foil shape and a plate shape. There are no particular limitations on the shape of the anode current collector in planar view, and examples thereof may include a circle shape, an oval shape, a rectangular shape, and an arbitrary polygonal shape.

Also, the thickness of the anode current collector varies with the shape. For example, it is in a range of 1 µm to 50 µm, and more preferably in a range of 5 µm to 20 µm.

(2) Li Storing Layer

The Li storing layer comprises places to store Li where the metal Li can be deposited inside the Li storing layer. Examples of the Li storing layer are a carbon material, or a mixture of a carbon material and a binder, and a mixture of a carbon material and a solid electrolyte. Also, in the present disclosure, it is preferable that the thickness of the Li storing layer is usually 83 µm or less. The Li storing layer arranged between the anode current collector and the solid electrolyte layer has a thickness of 83 µm or less, so that the metal lithium deposited inside the Li storing layer can inhibit the lithium ion conducting path from being cut off, and thus the usage rate of the deposited metal lithium can be improved. Meanwhile, the thickness of the Li storing layer is preferably 4 µm or more. The Li storing layer arranged between the anode current collector and the solid electrolyte layer has a thickness of 4 µm or more, so as to inhibit the dendrite growth of the metal lithium and the self-discharge of the cathode active material in the cathode active material layer side, and thus the discharge capacity increases and the coulomb efficiency of the battery can be increased. Incidentally, the method for measuring the thickness of the Li storing layer may be a method capable of measuring the length in µm order, and examples thereof may include a micrometer. Also, it is preferable that the Li storing layer does not contain an anode active material.

Further, in the present disclosure, it is preferable that the amount of Li storage of the Li storing layer to the cathode charging capacity (amount of Li storage/cathode charging capacity) measured from the calculation method described below is usually 0.13 or more. Meanwhile, the amount of Li storage of the Li storing layer to the cathode charging capacity is preferably 3.02 or less. Incidentally, the amount of Li storage in the present disclosure refers to the capacity of lithium (mAh) storable inside the Li storing layer when the metal lithium is filled in all the places to store Li in the Li storing layer. The place to store Li shows the void in the Li storing layer. Thus, a method to measure the place to store Li may be a method capable of measuring the void in the Li storing layer, and examples thereof may include a mercury press-in method, and a method using the volume of the Li storing layer and the true density of the Li storing layer.

(2-1) Carbon Material

Examples of the carbon material may include KETJEN-BLACK (KB) (an electro-conductive carbon black), vapor grown carbon fiber (VGCF), acetylene black (AB), activated carbon, furnace black, carbon nanotube (CNT), and graphene. It is preferable to use KETJENBLACK (KB) as the carbon material. In the case of KETJENBLACK, a lithium ion is not easily intercalated in between layers, and thus charge and discharge do not easily proceed at nobler potential than that of the deposition and dissolution potential of the metal lithium; it is preferable to improve energy density of the battery.

The average particle size ($D_{50}$) of the carbon material is, for example, preferably in a range of 10 nm to 10 μm, and more preferably in a range of 15 nm to 5 μm. Incidentally, as the average particle size, a value calculated from a laser diffraction particle distribution meter or a value measured based on an image analysis using an electron microscope such as SEM may be used.

(2-2) Binder

Examples of the binder may include a fluorine-based resin such as polyvinylidene fluoride (PVDF) and polytetra fluoroethylene (PTFE), and a rubber-based resin such as styrene butadiene rubber (SBR) and acrylate butadiene rubber (ABR). The fluorine-based resin has characteristics that chemical stability and insulating properties are high. There are no particular limitations on the content of the resin in the Li storing layer; for example, the content is 5 weight % or more, may be 15 weight % or more, and may be 25 weight % or more. The content of the resin in the Li storing layer may be 100 weight %, and may be less than 100 weight %.

(2-3) Solid Electrolyte

There are no particular limitations on the solid electrolyte in the Li storing layer as long as it can be used in an all solid lithium ion battery, and examples thereof may include an inorganic solid electrolyte such as a sulfide solid electrolyte and an oxide solid electrolyte. Examples of the sulfide solid electrolyte may include $Li_2S$—$P_2S_5$, $Li_2S$—$P_2S_5$—LiI, $Li_2S$—$P_2S_5$—LiI—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$ $B_2S_3$. $Li_2S$—$P_2S_5$—$Z_mS_n$ (provided that m and n is a positive number; Z is one of Ge, Zn, and Ga), $Li_2S$—$GeS_2$, $Li_2S$—$SiS_2$—$Li_3PO_4$, $Li_2S$—$SiS_2$-$Li_xMO_y$ (provided that x and y is a positive number; M is one of P, Si, Ge, B, Al, Ga, and In). Also, examples of the oxide solid electrolyte may include $Li_2O$—$B_2O_3$—$P_2O_3$, $Li_2O$—$SiO_2$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w<1), and $Li_{3.6}Si_{0.6}P_{0.4}O_4$. Incidentally, the description of "$Li_2S$—$P_2S_5$" above refers to a sulfide solid electrolyte comprising a raw material composition including $Li_2S$ and $P_2S_5$, and the likewise applies to the other descriptions.

In particular, the sulfide solid electrolyte is preferably provided with an ion conductor containing Li, A (A is at least one kind of P, Si, Ge, Al, and B), and S. Further, it is preferable that the ion conductor has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow the sulfide solid electrolyte to have high chemical stability. The proportion of the anion structure of an ortho composition to all the anion structures in the ion conductor is, preferably 70 mol % or more, and more preferably 90 mol % or more. The proportion of the anion structure of an ortho composition may be determined by a method such as a Raman spectroscopy, NMR, and XPS.

The sulfide solid electrolyte may contain a lithium halide in addition to the ion conductor. Examples of the lithium halide may include LiF, LiCl, LiBr, and LiI, and among them, LiCl, LiBr, and LiI are preferable. The proportion of LiX (X=I, Cl, and Br) in the sulfide solid electrolyte is, for example, in a range of 5 mol % to 30 mol %, and may be in a range of 15 mol % to 25 mol %.

The solid electrolyte may a crystalline material and may be an amorphous material. Also, the solid electrolyte may be glass, and may be crystallized glass (glass ceramic). Examples of the shape of the solid electrolyte may include a granular shape.

The average particle size ($D_{50}$) of the solid electrolyte is, for example, preferably in a range of 50 nm to 10 μm, and preferably in a range of 100 nm to 5 μm. Incidentally, as the average particle size, a value calculated from a laser diffraction particle distribution meter or a value measured based on an image analysis using an electron microscope such as SEM may be used.

(2-4) Mixture Ratio for Li Storing Layer

The Li storing layer comprises places to store Li where the metal lithium can be deposited inside the Li storing layer. Examples of the Li storing layer are a carbon material, or a mixture of a carbon material and a binder, and a mixture of a carbon material and a solid electrolyte. Accordingly, the mixture ratio of the mixture comprising a carbon material and a binder, and the mixture ratio of the mixture comprising a carbon material and a solid electrolyte are described as below.

(2-4-1) Mixture Ratio for Li Storing Layer Including Carbon Material and Binder

The ratio of the carbon material and the binder in the Li storing layer is, in relation to the weight ratio of these materials, preferably carbon material:binder=1:20 to 10:1, and more preferably carbon material:binder=1:19 to 10:1.

(2-4-2) Mixture Ratio for Li Storing Layer Including Carbon Material and Solid Electrolyte The ratio of the carbon material and the solid electrolyte in the Li storing layer is, in relation to the weight ratio of these materials, preferably carbon material:solid electrolyte=1:1 to 10:1, and more preferably carbon material:solid electrolyte=2:1 to 10:0.

Examples of the method for fabricating the mixture including the carbon material and the binder, or the mixture including the carbon material and the solid electrolyte may include hand mixing using a mortar and a pestle, homogenizer, and mechanical milling. The mechanical milling may be dry mechanical milling and may be dry mechanical milling.

There are no particular limitations on the mechanical milling as long as it is a method for mixing the carbon material with the binder, or the carbon material with the solid electrolyte, while applying a mechanical energy. Examples thereof may include ball milling vibration milling, turbo milling, mechano fusion, and disc milling. Among them, ball milling is preferable, and planetary ball milling is particularly preferable.

A liquid to be used for fabricating the mixture using a homogenizer is preferably non-protonic to the extent that a hydrogen sulfide is not generated. Specific examples thereof may include a non-protonic liquid such as a polar non-protonic liquid, and a non-polar non-protonic liquid.

Incidentally, it is preferable that the Li storing layer in the present disclosure has lower Li ion conductivity than that of the solid electrolyte layer described below. The Li ion conductivity of the Li storing layer is lower than that of the solid electrolyte layer, so as to increase the likelihood the interface between the solid electrolyte layer and the Li storing layer becomes the deposition origin of the metal lithium; thus, the deposited metal lithium is not distanced so far from the cathode active material layer to allow the reversibility of the deposition and dissolution of the metal lithium to improve, which is conceived to facilitate the improvement in the coulomb efficiency of the battery.

(3) Solid Electrolyte Layer

The solid electrolyte layer is a layer formed between the cathode active material layer and the anode current collector. Also, the solid electrolyte layer comprises at least a solid electrolyte, and may further contain a binder as required. The solid electrolyte to be used in the solid electrolyte layer is in the same contents as those described in "(2-2) Solid electrolyte" above; thus, the descriptions herein are omitted. Incidentally, as the solid electrolyte to be used in the solid electrolyte layer, the same solid electrolyte as in the Li storing layer may be used, and a solid electrolyte different from the one in the Li storing layer may be used.

The content of the solid electrolyte in the solid electrolyte layer is, for example, in a range of 10 weight % to 100 weight %, and may be in a range of 50 weight % to 100 weight %. Also, the thickness of the solid electrolyte layer is, for example, in a range of 0.1 μm to 300 μm, and may be in a range of 0.1 μm to 100 μm.

(4) Cathode Active Material Layer

The cathode active material layer is a layer comprising at least a cathode active material, and may contain at least one of a solid electrolyte, a conductive material, and a binder, as required. The cathode active material usually contains Li. Examples of the cathode active material may include an oxide active material, and specific examples thereof may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, and $Li(Ni_{0.5}Mn_{1.5})O_4$; and an olivine type active material such as $LiCoPO_4$, $LiFePO_4$, $LiMnPO_4$, $LiNiPO_4$, and $LiCuPO_4$. Also, a Si-containing oxide such as $Li_2FeSiO_4$ and $Li_2MnSiO_4$ may be used as the cathode active material, and a sulfide such as sulfur, $Li_2S$, and polysulfide lithium may be used as the cathode active material. The average particle size ($D_{50}$) of the cathode active material is, for example, preferably in a range of 10 nm to 50 μm, more preferably in a range of 100 nm to 30 μm, and further preferably in a range of 1 μm to 20 μm. Incidentally, as the average particle size, a value calculated from a laser diffraction particle distribution meter or a value measured based on an image analysis using an electron microscope such as SEM may be used.

Also, a coating layer including a Li ion conductive oxide may be formed on the surface of the cathode active material. The reason therefor is to inhibit the reaction of the cathode active material with the solid electrolyte. Examples of the Li ion conductive oxide may include $LiNbO_3$, $Li_4Ti_5O_{12}$, and $Li_3PO_4$. The thickness of the coating layer is, for example, in a range of 0.1 nm to 100 nm, and may be in a range of 1 nm to 20 nm. The coverage of the coating layer on the surface of the cathode active material is, for example, 50% or more, and may be 80% or more.

When the cathode active material layer contains the solid electrolyte, there are no particular limitations on the kind of the solid electrolyte, and examples thereof may include a sulfide solid electrolyte. As the sulfide solid electrolyte, the same materials as the above described sulfide solid electrolyte may be used.

When the cathode active material layer contains a conductive material, the conductivity of the cathode active material layer may be improved by adding the conductive material. Examples of the conductive material may include acetylene black, KETJENBLACK, and carbon fiber. Also, the cathode active material layer may contain a binder. Examples of the kind of the binder may include a rubber-based binder such as butylene rubber (BR) and styrene butadiene rubber (SBR), and a fluoride-based binder such as polyvinylidene fluoride (PVDF). Also, the thickness of the cathode active material layer is, for example, preferably in a range of 0.1 μm to 1000 μm.

(5) Cathode Current Collector

The lithium solid battery usually comprises a cathode current collector for collecting currents of the cathode active material layer. Examples of the material for the cathode current collector may include SUS, aluminum, nickel, iron, titanium, and carbon. The features such as the thickness and the shape of the cathode current collector are preferably appropriately selected according to the factors such as application of the battery.

(6) Other Constitutions

The battery in the present disclosure may be a lithium solid battery in which an anode active material layer is arranged between the Li storing layer and the anode current collector at the time of assembly, or may be a lithium solid battery in which an anode active material layer is not arranged between the Li storing layer and the anode current collector at the time of assembly, but the metal lithium is deposited as the anode active material after charge. Also, the metal lithium deposited between the anode current collector and the solid electrolyte layer after the initial charge is used as the anode active material.

(7) Lithium Solid Battery

There are no particular limitations on the lithium solid battery in the embodiments as long as the battery comprises the anode current collector, the solid electrolyte layer, the cathode active material layer, the cathode current collector, and the Li storing layer. Also, the lithium solid battery may be a primary battery and may be a secondary battery, but preferably a secondary battery among them so as to be repeatedly charged and discharged and useful as a car-mounted battery, for example. Examples of the shape of the lithium solid battery may include a coin shape, a laminate shape, a cylindrical shape, and a square shape.

Also, the present disclosure may provide a method for producing a lithium solid battery comprising a pressing step of arranging the above described cathode active material layer to overlap the above described solid electrolyte layer to press thereof. There are no particular limitations on the pressing pressure. For example, the pressure is 1 ton/cm$^2$ or more, and may be 4 ton/cm$^2$ or more.

Incidentally, comparative embodiments are in almost the same contents as those for each constitution of the above described embodiment; thus, each of the description is omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Fabrication of Sulfide Solid Electrolyte $Li_2S$ (from Rockwood Lithium) of 0.550 g, $P_2S_5$ (from Sigma-Aldrich Co. LLC.) of 0.887 g, LiI (from Sigma-Aldrich Co. LLC.) of 0.285 g, and LiBr (from Kojundo Chemical Laboratory Co., Ltd.) of 0.277 g were weight and mixed by an agate mortar for 5 minutes. Dehydrated heptane (from KANTO CHEMICAL CO., INC.) of 4 g was further added to the mixture, mechanical milling therefor was conducted for 40 hours using a planetary ball mill to obtain a sulfide solid electrolyte.

Preparation of Cathode Material

As the cathode active material, $LiNi_{1/3}Co_{1/3}Mn_{1/3}O_2$ (from Nichia Corporation) was used. A surface treatment of $LiNbO_3$ had been performed to the cathode active material in advance. This cathode active material, VGCF (from SHOWA DENKO K.K) as a conductive carbon, and the sulfide solid electrolyte were weighed so as to be 85.3:1.3:13.4 in the weight ratio, and the mixture thereof as the cathode active material was used as the cathode material.

Preparation of Material for Li Storing Layer

KETJENBLACK (from Lion Specialty Chemicals Co., Ltd.; ECP600JD:KB; $D_{50}$=34 nm) as the carbon material, and PVDF (from KUREHA CORPORATION; L #9305) were used and weighed so as to be KB:PVDF=85:15 in the weight ratio, and hand-mixed by a mortar and a pestle to obtain a mixture as the material for the Li storing layer.

Fabrication of Lithium Solid Battery

The sulfide solid electrolyte was weight to be 101.7 mg in a mold made of ceramic (cross-sectional area: 1 $cm^2$, a cylindrical shaped container), and pressed at 1 ton/$cm^2$ to form a solid electrolyte layer. The cathode material of 31.3 mg was added to one surface of the solid electrolyte layer and pressed at 6 ton/$cm^2$ to form a cathode active material layer. The material for the Li storing layer of 0.25 mg/$cm^2$ was added to the other surface of the solid electrolyte layer that was opposite from the cathode active material layer. Also, a cathode current collector (an aluminum foil) to the cathode active material layer side and an anode current collector (a Cu foil) to the anode layer side were respectively arranged, and the fabricated lithium solid battery was confined at 0.2 N to obtain a lithium solid battery for Example 1. For Example 1, the lithium solid battery with the Li storing layer having a thickness of 4 μm was obtained. Incidentally, all the operations using the sulfide solid electrolyte were conducted in a globe box under a dry Ar atmosphere.

Example 2

A lithium solid battery was obtained in the same manner as in Example 1 except that the thickness of the Li storing layer was changed to 10 μm.

Example 3

A lithium solid battery was obtained in the same manner as in Example 1 except that the thickness of the Li storing layer was changed to 22 μm.

Example 4

Preparation of material for Li storing layer KETJEN-BLACK (from Lion Specialty Chemicals Co., Ltd.; ECP600JD:KB; $D_{50}$=34 nm) as the carbon material, and PVDF (from KUREHA CORPORATION; L #9305) were used and weighed so as to be KB:PVDF=75:25 in the weight ratio, and hand-mixed by a mortar and a pestle to obtain a mixture as the material for the Li storing layer.

Fabrication of Lithium Solid Battery

The sulfide solid electrolyte was weight to be 101.7 mg in a mold made of ceramic (cross-sectional area: 1 $cm^2$, a cylindrical shaped container), and pressed at 1 ton/$cm^2$ to form a solid electrolyte layer. The cathode material of 31.3 mg was added to one surface of the solid electrolyte layer and pressed at 6 ton/$cm^2$ to form a cathode active material layer. The material for the Li storing layer of 0.10 mg/$cm^2$ was added to the other surface of the solid electrolyte layer that was opposite from the cathode active material layer. Also, a cathode current collector (an aluminum foil) to the cathode active material layer side and an anode current collector (a Cu foil) to the anode layer side were respectively arranged, and the fabricated lithium solid battery was confined at 0.2 N to obtain a lithium solid battery for Example 4. For Example 4, the lithium solid battery with the Li storing layer having a thickness of 5 μm was obtained. Incidentally, all the operations using the sulfide solid electrolyte were conducted in a globe box under a dry Ar atmosphere.

Example 5

A lithium solid battery was obtained in the same manner as in Example 4 except that the thickness of the Li storing layer was changed to 11 μm.

Example 6

A lithium solid battery was obtained in the same manner as in Example 4 except that the thickness of the Li storing layer was changed to 18 μm.

Example 7

Preparation of Material for Li Storing Layer

KETJENBLACK (from Lion Specialty Chemicals Co., Ltd.; ECP600JD:KB; $D_{50}$=34 nm) as the carbon material, and PVDF (from KUREHA CORPORATION; L #9305) were used and weighed so as to be KB:PVDF=50:50 in the weight ratio, and hand-mixed by a mortar and a pestle to obtain a mixture as the material for the Li storing layer.

Fabrication of Lithium Solid Battery

The sulfide solid electrolyte was weight to be 101.7 mg in a mold made of ceramic (cross-sectional area: 1 $cm^2$, a cylindrical shaped container), and pressed at 1 ton/$cm^2$ to form a solid electrolyte layer. The cathode material of 31.3 mg was added to one surface of the solid electrolyte layer and pressed at 6 ton/$cm^2$ to form a cathode active material layer. The material for the Li storing layer of 0.05 mg/$cm^2$ was added to the other surface of the solid electrolyte layer that was opposite from the cathode active material layer. Also, a cathode current collector (an aluminum foil) to the cathode active material layer side and an anode current collector (a Cu foil) to the anode layer side were respectively arranged, and the fabricated lithium solid battery was confined at 0.2 N to obtain a lithium solid battery for Example 7. For Example 7, the lithium solid battery with the Li storing layer having a thickness of 6 μm was obtained. Incidentally, all the operations using the sulfide solid electrolyte were conducted in a globe box under a dry Ar atmosphere.

Example 8

Preparation of Material for Li Storing Layer

KETJENBLACK (from Lion Specialty Chemicals Co., Ltd.; ECP600JD:KB; $D_{50}$=34 nm) as the carbon material, and PVDF (from KUREHA CORPORATION; L #9305) were used and weighed so as to be KB:PVDF=11:89 in the weight ratio, and hand-mixed by a mortar and a pestle to obtain a mixture as the material for the Li storing layer.

Fabrication of Lithium Solid Battery

The sulfide solid electrolyte was weight to be 101.7 mg in a mold made of ceramic (cross-sectional area: 1 cm$^2$, a cylindrical shaped container), and pressed at 1 ton/cm$^2$ to form a solid electrolyte layer. The cathode material of 31.3 mg was added to one surface of the solid electrolyte layer and pressed at 6 ton/cm$^2$ to form a cathode active material layer. The material for the Li storing layer of 0.55 mg/cm$^2$ was added to the other surface of the solid electrolyte layer that was opposite from the cathode active material layer. Also, a cathode current collector (an aluminum foil) to the cathode active material layer side and an anode current collector (a Cu foil) to the anode layer side were respectively arranged, and the fabricated lithium solid battery was confined at 0.2 N to obtain a lithium solid battery for Example 8. For Example 8, the lithium solid battery with the Li storing layer having a thickness of 9 μm was obtained. Incidentally, all the operations using the sulfide solid electrolyte were conducted in a globe box under a dry Ar atmosphere.

Example 9

A lithium solid battery was obtained in the same manner as in Example 8 except that the thickness of the Li storing layer was changed to 14 μm.

Example 10

Preparation of Material for Li Storing Layer

KETJENBLACK (from Lion Specialty Chemicals Co., Ltd.; ECP600JD:KB; $D_{50}$=34 nm) as the carbon material, and PVDF (from KUREHA CORPORATION; L #9305) were used and weighed so as to be KB:PVDF=5:95 in the weight ratio, and hand-mixed by a mortar and a pestle to obtain a mixture as the material for the Li storing layer.

Fabrication of Lithium Solid Battery

The sulfide solid electrolyte was weight to be 101.7 mg in a mold made of ceramic (cross-sectional area: 1 cm$^2$, a cylindrical shaped container), and pressed at 1 ton/cm$^2$ to form a solid electrolyte layer. The cathode material of 31.3 mg was added to one surface of the solid electrolyte layer and pressed at 6 ton/cm$^2$ to form a cathode active material layer. The material for the Li storing layer of 0.35 mg/cm$^2$ was added to the other surface of the solid electrolyte layer that was opposite from the cathode active material layer. Also, a cathode current collector (an aluminum foil) to the cathode active material layer side and an anode current collector (a Cu foil) to the anode layer side were respectively arranged, and the fabricated lithium solid battery was confined at 0.2 N to obtain a lithium solid battery for Example 10. For Example 10, the lithium solid battery with the Li storing layer having a thickness of 5 μm was obtained. Incidentally, all the operations using the sulfide solid electrolyte were conducted in a globe box under a dry Ar atmosphere.

Example 11

A lithium solid battery was obtained in the same manner as in Example 10 except that the thickness of the Li storing layer was changed to 9 μm.

Example 12

A lithium solid battery was obtained in the same manner as in Example 10 except that the thickness of the Li storing layer was changed to 28 μm.

Example 13

Preparation of Material for Li Storing Layer

KETJENBLACK (from Lion Specialty Chemicals Co., Ltd.; ECP600JD:KB; $D_{50}$=34 nm) as the carbon material, and the sulfide solid electrolyte fabricated in Example 1 as the solid electrolyte (SE) were used and weighed so as to be KB:SE=2:1 in the weight ratio, hand-mixed followed by addition of heptane, and mixed using a homogenizer (from SMT Corporation, UH-50) for 3 minutes to obtain a mixture as the material for the Li storing layer.

Fabrication of Lithium Solid Battery

The sulfide solid electrolyte was weight to be 101.7 mg in a mold made of ceramic (cross-sectional area: 1 cm$^2$, a cylindrical shaped container), and pressed at 1 ton/cm$^2$ to form a solid electrolyte layer. The cathode material of 31.3 mg was added to one surface of the solid electrolyte layer and pressed at 6 ton/cm$^2$ to form a cathode active material layer. The material for the Li storing layer of 2 mg/cm$^2$ was added to the other surface of the solid electrolyte layer that was opposite from the cathode active material layer. Also, a cathode current collector (an aluminum foil) to the cathode active material layer side and an anode current collector (a SUS foil) to the anode layer side were respectively arranged, and the fabricated lithium solid battery was confined at 0.2 N to obtain a lithium solid battery for Example 13. For Example 13, the lithium solid battery with the Li storing layer having a thickness of 38 μm was obtained. Incidentally, all the operations using the sulfide solid electrolyte were conducted in a globe box under a dry Ar atmosphere.

Example 14

A lithium solid battery was obtained in the same manner as in Example 13 except that the thickness of the Li storing layer was changed to 50 μm.

Example 15

A lithium solid battery was obtained in the same manner as in Example 13 except that the thickness of the Li storing layer was changed to 83 μm.

Example 16

Material for Li Storing Layer

KETJENBLACK (from Lion Specialty Chemicals Co., Ltd.; ECP600JD:KB; $D_{50}$=34 nm) as the carbon material was used as the material for the Li storing layer.

Fabrication of Lithium Solid Battery

The sulfide solid electrolyte was weight to be 101.7 mg in a mold made of ceramic (cross-sectional area: 1 cm$^2$, a cylindrical shaped container), and pressed at 1 ton/cm$^2$ to form a solid electrolyte layer. The cathode material of 31.3 mg was added to one surface of the solid electrolyte layer and pressed at 6 ton/cm$^2$ to form a cathode active material layer. The material for the Li storing layer of 2 mg/cm$^2$ was added to the other surface of the solid electrolyte layer that was opposite from the cathode active material layer. Also, a cathode current collector (an aluminum foil) to the cathode active material layer side and an anode current collector (a SUS foil) to the anode layer side were respectively arranged, and the fabricated lithium solid battery was confined at 0.2 N to obtain a lithium solid battery for Example 16. For Example 16, the lithium solid battery with the Li storing layer having a thickness of 67 μm was obtained. Incidentally, all the operations using the sulfide solid electrolyte were conducted in a globe box under a dry Ar atmosphere.

Example 17

A lithium solid battery was obtained in the same manner as in Example 16 except that the thickness of the Li storing layer was changed to 70 μm.

Comparative Example 1

A lithium solid battery was obtained in the same manner as in Example 13 except that the thickness of the Li storing layer was changed to 183 μm.

Comparative Example 2

A lithium solid battery was obtained in the same manner as in Example 1 except that the thickness of the Li storing layer was changed to 2 μm.

[Evaluation]

Method for Calculating Thickness of Li Storing Layer and Place to Store Li

The thickness of the Li storing layer and place to store Li regarding Examples 1 to 17, and Comparative Examples 1 and 2 was respectively calculated by the method described below.

First, the anode current collector and the sulfide solid electrolyte were arranged in a cylindrical-shaped container and pressed at 1 ton/cm² to form the solid electrolyte layer. The cathode material was added to one surface of the solid electrolyte layer and pressed at 6 ton/cm² to form the cathode active material layer, and thereby fabricated was the lithium solid battery (cell) in the state the Li storing layer was not present between the anode current collector and the solid electrolyte layer. The fabricated lithium solid battery was confined at 2 N, and then the height of the cell ($H_1$) was measured using a micrometer in a stacked direction that the constituents of the cell: each of the current collector, the cathode active material layer, and the solid electrolyte layer, were stacked.

The weight of the material for the Li storing layer (w) to be arranged between the anode current collector and the solid electrolyte layer was weighed, the material for the Li storing layer was arranged between the anode current collector and the solid electrolyte layer, and pressed at 4 ton/cm² to form the Li storing layer. The height of the cell wherein the Li storing layer was formed ($H_2$) was measured by the micrometer in the same manner as in the measurement method for the height of the cell described above. After that, the thickness of the Li storing layer in the stacked direction (d) was calculated from the difference between $H_2$ and $H_1$ ($H_2-H_1$).

The area occupied by the material to store Li ($V_1$) in the Li storing layer was calculated from the weight of the Li storing layer (w) described above, the true density of the KETJENBLACK as the carbon material used in the Li storing layer, and the true density of the solid electrolyte used.

The actual volume of the material for Li storing layer ($V_2$) in the Li storing layer was calculated from the product of the thickness of the Li storing layer (d) and the bottom area of the battery. The value of the volume subtracting $V_1$ from $V_2$ was calculated as the space volume ($V_3=V_2-V_1$), and the value having $V_2$ as a denominator and $V_1$ as a numerator multiplied by 100 was calculated as the void (%), that was the place to store Li, in the Li storing layer.

Method for Calculating Amount of Li Storage

The amount of Li storage refers to the capacity of lithium (mAh) storable inside the Li storing layer when the metal lithium is filled in all the places to store Li in the Li storing layer. The amount of Li storage was calculated as below.

The volume of the place to store Li in the Li storing layer was calculated from the value subtracting the volume occupied by the material for the Li storing layer in the Li storing layer from the above described actual volume of the material for the Li storing layer ($V_2$) in the Li storing layer ($V_3=V_2-V_1$).

The weight of the lithium ($w_{Li}$) filled in the place to store Li in the Li storing layer was calculated from the above described $V_3$ multiplied by the lithium density ($d_{Li}$) ($w_{Li}=V_3 \times d_{Li}$).

The amount of Li storage (mAh) was calculated from the weight of the lithium ($w_{Li}$) filled in the place to store Li in the Li storing layer multiplied by the theoretical capacity of the metal lithium (3861 mAh/g).

The amount of Li storage/cathode charging capacity was the standardized value dividing the amount of storage (mAh) by the charging capacity.

The results of the amount of Li storage/cathode charging capacity are shown in Table 1. As shown in Table 1, it was confirmed from the results of Examples 1 to 17, and Comparative Examples 1 and 2 that the amount of Li storage/cathode charging capacity increased when the thickness of the Li storing layer was thicker.

Charge and Discharge Measurement

The lithium solid batteries obtained in Examples 1 to 4 and Comparative Examples 1 to 2 were used to conduct a charge and discharge measurement after leaving the batteries in a thermostatic tank at 60° C. for 3 hours in advance. The conditions for the measurement were: at 60° C., the current density of 8.7 mA/cm², constant current charge, charge terminated when the charging capacity reached at 4.35 mAh/cm², and the battery paused for 10 minutes. After that, the battery was CC-discharged at 60° C. and the current density of 0.435 mA/cm², and the discharge was terminated when the voltage lower limit reached at 3.0 V. Incidentally, the charge corresponds to the deposition of lithium on the anode current collector, and the discharge corresponds to the dissolution of lithium on the anode current collector. The lithium solid battery of the present disclosure was charged to start with.

Open Circuit Voltage Measurement

The open circuit voltage (OCV) of the fabricated batteries was respectively measured after 10 minutes passed from the termination of charge. The values of each OCV for the batteries in Examples 1 to 12, and Comparative Examples 1 and 2 are described in Table 1.

Table 1 is a table that shows the constituents of the Li storing layer, the amount of Li storage/cathode charging capacity, the coulomb efficiency of the battery, and the thickness and the OCV of the Li storing layer in Examples and Comparative Examples.

TABLE 1

| | Constituents of Li storing layer (weight ratio) | Amount of Li storage/ Cathode charging capacity | Coulomb efficiency | Thickness (μm) | OCV (V vs Li/Li+) |
|---|---|---|---|---|---|
| Comp. Ex. 1 | KB:SE = 2:1 | 6.88 | 100.0 | 183 | 4.29 |
| Comp. Ex. 2 | KB:PVDF = 85:15 | 0.06 | 89.5 | 2 | 3.88 |
| Example 1 | KB:PVDF = 85:15 | 0.13 | 131.6 | 4 | 4.09 |
| Example 2 | KB:PVDF = 85:15 | 0.39 | 136.8 | 10 | 4.10 |
| Example 3 | KB:PVDF = 85:15 | 0.94 | 142.1 | 22 | 4.23 |
| Example 4 | KB:PVDF = 75:25 | 0.23 | 205.8 | 5 | 4.23 |
| Example 5 | KB:PVDF = 75:25 | 0.46 | 165.8 | 11 | 4.12 |
| Example 6 | KB:PVDF = 75:25 | 0.79 | 142.6 | 18 | 4.27 |
| Example 7 | KB:PVDF = 50:50 | 0.27 | 171.6 | 6 | 4.22 |
| Example 8 | KB:PVDF = 11:89 | 0.29 | 166.3 | 9 | 4.18 |
| Example 9 | KB:PVDF = 11:89 | 0.50 | 158.9 | 14 | 4.30 |
| Example 10 | KB:PVDF = 5:95 | 0.15 | 110.7 | 5 | 4.25 |
| Example 11 | KB:PVDF = 5:95 | 0.21 | 168.9 | 9 | 4.22 |
| Example 12 | KB:PVDF = 5:95 | 0.80 | 120.5 | 28 | 3.99 |
| Example 13 | KB:SE = 2:1 | 1.34 | 157.9 | 38 | — |
| Example 14 | KB:SE = 2:1 | 1.91 | 142.1 | 50 | — |
| Example 15 | KB:SE = 2:1 | 3.02 | 126.3 | 83 | — |
| Example 16 | KB | 2.75 | 136.8 | 67 | — |
| Example 17 | KB | 2.89 | 121.1 | 70 | — |

From the results, the value of the OCV in Comparative Example 2, in which the amount of Li storage/cathode charging capacity was 0.13 or less, was smaller than that in Examples 1 to 12 and Comparative Example 1; it is presumed that short circuit occurred in Comparative Example 2 due to the dendrite growth of the metal lithium. Accordingly, it is conceived that the amount of Li storage/cathode charging capacity of the Li storing layer was 0.13 or more, and thus the dendrite growth of the metal lithium was inhibited, the self-discharge of the cathode active material in the cathode active material layer side was inhibited, the discharge capacity increased, and the coulomb efficiency of the battery increased.

Coulomb Efficiency

The coulomb efficiency of a battery in the present disclosure is a value calculated from the discharging capacity during the charge and discharge measurement described above divided by the charging capacity, the result multiplied by 100; the value shows the reversibility of the deposition and dissolution of the metal lithium.

Figure 2:
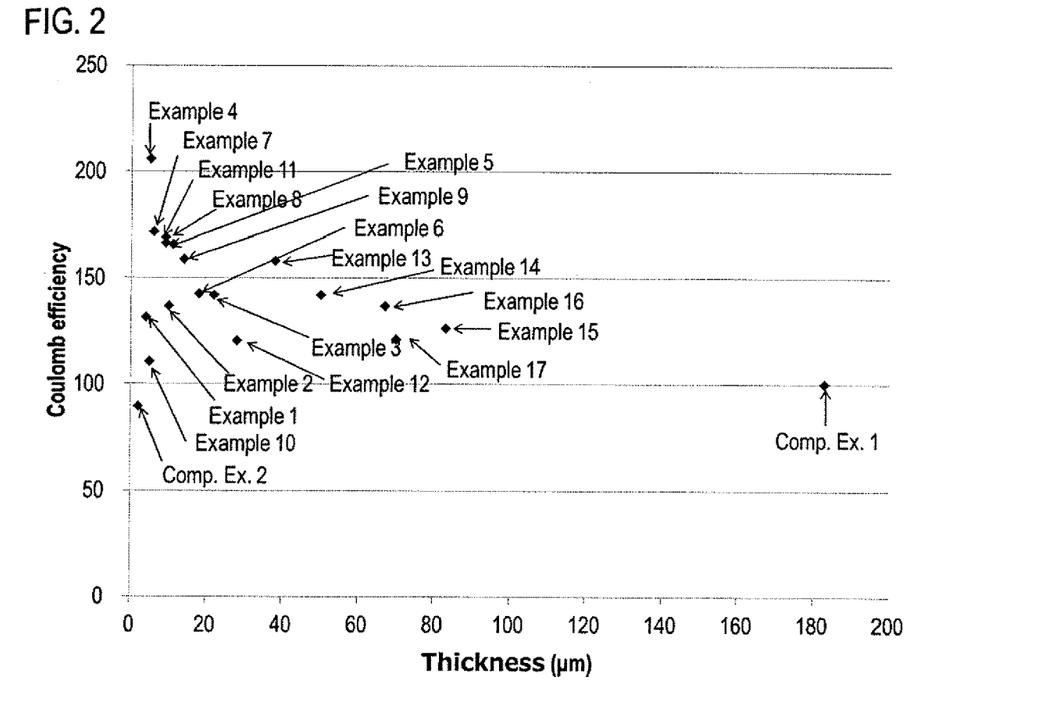
FIG. 2 is a chart showing the coulomb efficiency of the battery to the thickness of the Li storing layer in Examples and Comparative Examples.
Figure 3:
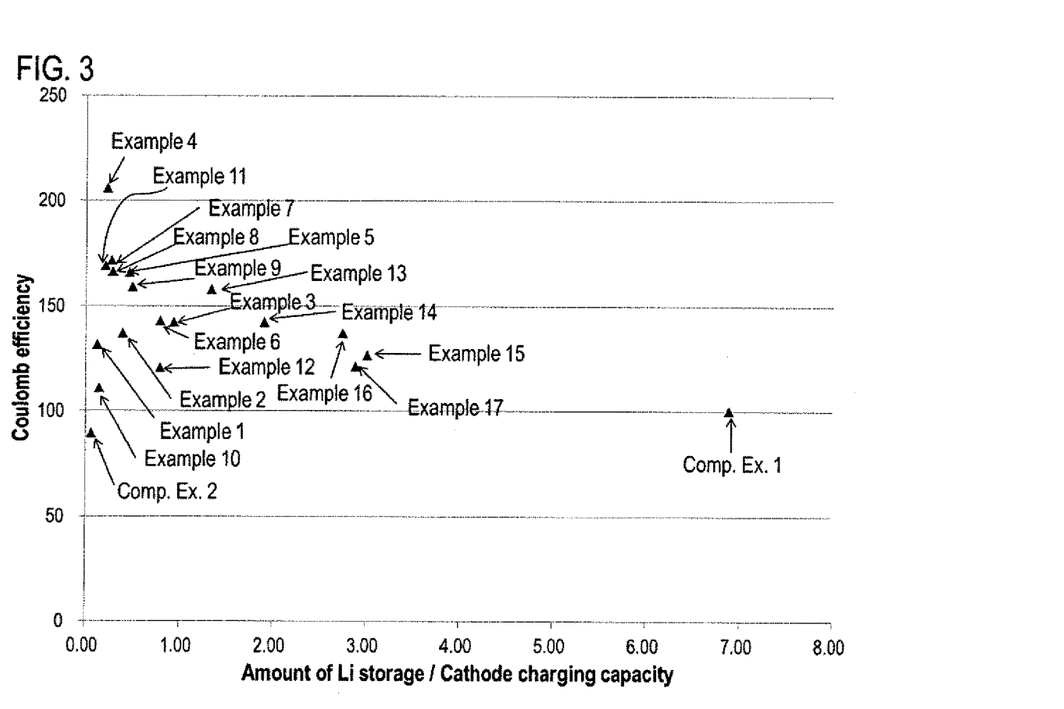
FIG. 3 is a chart showing the coulomb efficiency of the battery to the amount of Li storage/cathode charging capacity of the Li storing layer in Examples and Comparative Examples.

The results of the coulomb efficiency of the batteries are shown in FIG. 2 and FIG. 3. The values of the coulomb efficiency of the batteries respectively shows the values of the coulomb efficiency of each Examples and Comparative Example 2 when the value of Comparative Example 1 is regarded as 100. The values are hereinafter regarded as a coulomb efficiency ratio. The above described coulomb efficiency ratio is plotted to the thickness of the Li storing layer in the graph in FIG. 2, and the above described coulomb efficiency ratio is plotted to the amount of Li storage/cathode charging capacity in the graph in FIG. 3.

When Examples 1 to 17 are compared to Comparative Example 1 in FIG. 2, it is conceived that the Li storing layer arranged between the anode current collector and the solid electrolyte layer had the thickness of 83 μm or less, so that the metal lithium deposited inside the Li storing layer inhibited the lithium ion conducting path from being cut off, and thus the usage rate of the deposited metal lithium was improved to increase the coulomb efficiency of the battery.

When Examples 1 to 17 are compared to Comparative Example 2 in FIG. 3, it is conceived that the amount of Li storage/cathode charging capacity of the Li storing layer arranged between the anode current collector and the solid electrolyte layer was 0.13 or more, and thus the short circuit due to dendrite was inhibited, the self-discharge of the cathode active material in the cathode active material layer side was inhibited, the discharge capacity increased, and the coulomb efficiency of the battery increased.

REFERENCE SIGNS LIST

1 . . . anode current collector
2 . . . Li storing layer
3 . . . solid electrolyte layer
4 . . . cathode active material layer
5 . . . cathode current collector
6 . . . anode active material layer
10 . . . lithium solid battery

What is claimed is:

1. A lithium solid battery comprising:
an anode current collector;
a solid electrolyte layer comprising:
    a sulfide solid electrolyte; and
    a binder;
a cathode active material layer comprising:
    a sulfide solid electrolyte; and
    a cathode active material;
a cathode current collector;
a Li storing layer between the anode current collector and the solid electrolyte layer, the Li storing layer comprising:
    a mixture of a sulfide solid electrolyte and a carbon material comprising a carbon black; and
    a binder comprising a polyvinylidene fluoride; and
an anode active material layer that is deposition lithium between the solid electrolyte layer and the Li storing layer,
wherein:
a weight ratio of the carbon material and the sulfide solid electrolyte in the Li storing layer is carbon material: sulfide solid electrolyte=2:1 to 10:1;
an amount of Li storage of the Li storing layer to a cathode charging capacity is 1.34 or more and 3.02 or less;
a thickness of the Li storing layer is 4 μm or more and 83 μm or less; and
a Li ion conductivity of the Li storing layer is lower than a Li ion conductivity of the solid electrolyte layer.

2. The lithium solid battery according to claim 1, wherein the solid electrolyte layer and the Li storing layer are obtained by a pressing method.

* * * * *